US011033935B2

(12) United States Patent
Czukor et al.

(10) Patent No.: US 11,033,935 B2
(45) Date of Patent: Jun. 15, 2021

(54) PARCEL-SORTING FACILITY WITH A SYSTEM FOR SWAPPING RECEPTACLES OVER AT SORTING OUTLETS

(71) Applicant: SOLYSTIC, Bagneux (FR)

(72) Inventors: Christophe Czukor, Chabeuil (FR); Luc Chirol, Paris (FR); Bruno Volta, Gif sur Yvette (FR)

(73) Assignee: SOLYSTIC, Bagneux (FR)

( * ) Notice: Subject to any disclaimer, the term of this patent is extended or adjusted under 35 U.S.C. 154(b) by 0 days.

(21) Appl. No.: 16/840,527

(22) Filed: Apr. 6, 2020

(65) Prior Publication Data
US 2020/0324320 A1 Oct. 15, 2020

(30) Foreign Application Priority Data

Apr. 10, 2019 (FR) ...................................... 1903822

(51) Int. Cl.
*B07C 3/08* (2006.01)
*B65G 47/90* (2006.01)
(Continued)

(52) U.S. Cl.
CPC .............. *B07C 3/08* (2013.01); *B65G 47/904* (2013.01); *B65G 47/905* (2013.01);
(Continued)

(58) Field of Classification Search
CPC ......... B07C 3/08; B07C 3/008; B65G 47/904; B65G 47/905; B65G 65/005; Y10S 209/90
See application file for complete search history.

(56) References Cited

U.S. PATENT DOCUMENTS 3,033,366 A * 5/1962 Atanasoff ................ B07C 3/08
209/562
8,919,529 B1 12/2014 Erceg et al.
(Continued)

FOREIGN PATENT DOCUMENTS

CN 107008656 A 8/2017
WO 2017/202242 A1 11/2017

OTHER PUBLICATIONS

French Search Report dated Feb. 5, 2020 issued by INPI from corresponding Application No. FR 1903822, 1 page.

*Primary Examiner* — Charles A Fox
*Assistant Examiner* — Jessica L Burkman
(74) *Attorney, Agent, or Firm* — Ware, Fressola, Maguire & Barber LLP

(57) ABSTRACT

A sorting facility (1) for sorting parcels (2), has a sorting conveyor (3), sorting outlets (4) distributed along said conveyor, and a monitoring and control unit (7) for controlling the conveyor so as to sort the parcels into the outlets as a function of their destination addresses. Each outlet is arranged to store a plurality of receptacles (6), each of which is associated with a parcel destination address in a memory of the unit. At each outlet, the facility has a swap-over device (8) for swapping the receptacles over. The unit controls the swap-over device so that a receptacle for which the destination address associated with it in the memory of the monitoring and control unit corresponds to the destination address of a current parcel to be sorted is held stationary in a filling position in which the receptacle is positioned under the sorting outlet so as to receive a parcel.

18 Claims, 3 Drawing Sheets

(51) Int. Cl.
*B65G 65/00* (2006.01)
*B65G 11/02* (2006.01)
*B65G 35/06* (2006.01)

(52) U.S. Cl.
CPC .......... *B65G 65/005* (2013.01); *B65G 11/023* (2013.01); *B65G 35/06* (2013.01)

(56) References Cited

U.S. PATENT DOCUMENTS

2007/0056885 A1* 3/2007 Enenkel .................. B07C 3/008
 209/584
2018/0333750 A1* 11/2018 Miette ....................... B07C 3/02

* cited by examiner

PARCEL-SORTING FACILITY WITH A SYSTEM FOR SWAPPING RECEPTACLES OVER AT SORTING OUTLETS

CROSS REFERENCE TO RELATED APPLICATIONS

This application claims priority under 35 USC § 119 to French Patent Application No. 1903822 filed on Apr. 10, 2019, which is hereby incorporated by reference in its entirety.

TECHNICAL FIELD

The invention relates to a sorting facility for sorting parcels, which sorting facility comprises a sorting conveyor, sorting outlets distributed along said conveyor, and a monitoring and control unit suitable for controlling the sorting conveyor so as to sort the parcels into the sorting outlets as a function of their destination addresses.

PRIOR ART

Nowadays, logistics platforms are equipped with automated parcel-sorting systems in order to process parcels coming from numerous sources and in order to deliver them to a large number of recipients.

Each of documents WO 2018/115608 and U.S. Pat. No. 8,919,529 discloses an automated parcel-sorting facility comprising a conveyor on which parcels to be sorted are conveyed and under which sorting outlets are distributed. In such a facility, a monitoring and control unit controls the sorting conveyor to sort the parcels as a function of their destination addresses.

The current increase in the volume of e-commerce purchases of goods that are packaged as "small import packets" is making it necessary to increase the number of sorting passes and the throughput rate of the conveyors, with the ensuing risk of damaging the parcels.

In parallel, the increase in the number of physical destinations in any one sorting plan is making it necessary to increase the number of sorting outlets and thus the footprint of the facility, i.e. the floor area occupied by said facility.

And, the higher the number of the sorting outlets, the larger the volume of the handling means implemented for retrieving the parcels needs to be.

SUMMARY OF THE INVENTION

An object of the present invention is to provide a sorting facility that contributes to solving the above-mentioned problems.

To this end, the invention provides a sorting facility for sorting parcels, the sorting facility comprises a sorting conveyor, sorting outlets distributed along said conveyor, and a monitoring and control unit suitable for controlling the sorting conveyor so as to sort the parcels into the sorting outlets as a function of their destination addresses, each sorting outlet being arranged to store a plurality of sorting receptacles, each of which is associated with a parcel destination address in a memory of the monitoring and control unit, said sorting facility being characterized in that, at each sorting outlet, it further comprises a swap-over device for swapping the receptacles over, the swap-over device comprises a shaft mounted to move in rotation about an axis and provided with docking means for docking with receptacles so that the shaft is designed to drive the docked receptacles in rotation about the axis, and in that the monitoring and control unit controls the swap-over device so that a receptacle for which the destination address associated with it in the memory of the monitoring and control unit corresponds to the destination address of a current parcel to be sorted is held stationary in a filling position in which the receptacle is positioned under the sorting outlet so as to receive a parcel.

The parcel-sorting facility of the invention may advantageously have the following features:

the swap-over device further comprises a locking cap provided with a side opening, said cap coming to cap the shaft and the docking means so as to prevent a receptacle that is docked with the docking means from being withdrawn when said receptacle is in a the filling position, and so as to allow a receptacle that is docked with the docking means to be removed via the opening in the cap when said receptacle is in a removal position in which it is angularly positioned on the opposite side of the shaft from a receptacle that is in the filling position;

the locking cap is also suitable for preventing a receptacle that is docked with the docking means from being withdrawn between the filling position and the removal position;

the swap-over device further comprises runners that are mutually parallel in pairs and that extend substantially horizontally from the shaft, the runners being arranged to carry the receptacles above the floor once the receptacles are docked;

each of the runners has a free end that is significantly inclined towards the floor;

the swap-over device comprises a receptacle position detection system suitable for determining which receptacle of the sorting outlet is in the filling position, and the monitoring and control unit contains, in a memory, the order of the receptacles at each sorting outlet and, in response to the detection performed by said detection system, causes the swap-over device to move in rotation so as to place in the filling position the receptacle that has its destination address corresponding to the destination address of the current parcel to be sorted;

a detection system for detecting the filling level of a receptacle in the filling position is provided, and, in response to a certain threshold of the filling level of the receptacle being exceeded, the monitoring and control unit causes the receptacle to be moved to the removal position;

each sorting outlet is equipped with a filling chute that extends downwards from the conveyor to a receptacle in the filling position;

the receptacles are bags that are open at their tops and that are mounted on trolleys having small wheels or casters; and the conveyor is a looped conveyor.

The basic idea of the invention is to have a number of "logical", or potential, sorting outlets that is greater than the number of physical sorting outlets.

For this purpose, each sorting outlet of the sorting facility is equipped with a plurality of receptacles, each of which is associated with a different destination address. A swap-over system for swapping receptacles over is also provided for moving the receptacles of the sorting outlet in rotation so as to position only one of them in the filling position under the appropriate sorting outlet.

It can be understood, for example, that for a physical sorting outlet having four receptacles each associated with a different parcel destination address, there are three logical outlets more than with merely a sorting outlet equipped with a single receptacle.

Thus, the sorting facility of the invention can serve as many destination addresses as there are receptacles assigned to the sorting outlet and can do so with a footprint equivalent to that of a conventional sorting facility.

BRIEF DESCRIPTION OF THE DRAWINGS

The present invention will be better understood and other advantages will appear on reading the following detailed description of embodiments given by way of non-limiting example and with reference to the accompanying drawings, in which.

DESCRIPTION OF A FIRST EMBODIMENT

Figure 2:
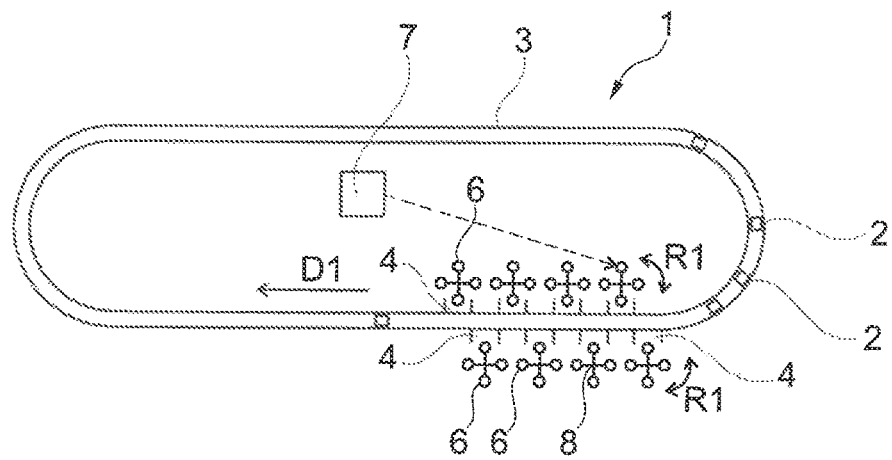
FIG. 2 is a diagrammatic view of a sorting facility of the invention.

FIG. 2 shows a sorting facility 1 of the invention for sorting parcels 2, which sorting facility is designed to equip a sorting center such as a logistics center for receiving and re-dispatching parcels 2.

The sorting facility 1 of the invention for sorting parcels 2 comprises a sorting conveyor 3, which, in this example, is a looped conveyor that moves in a certain conveying direction D1, and sorting outlets 4 distributed along the sorting conveyor 3.

Figure 1:
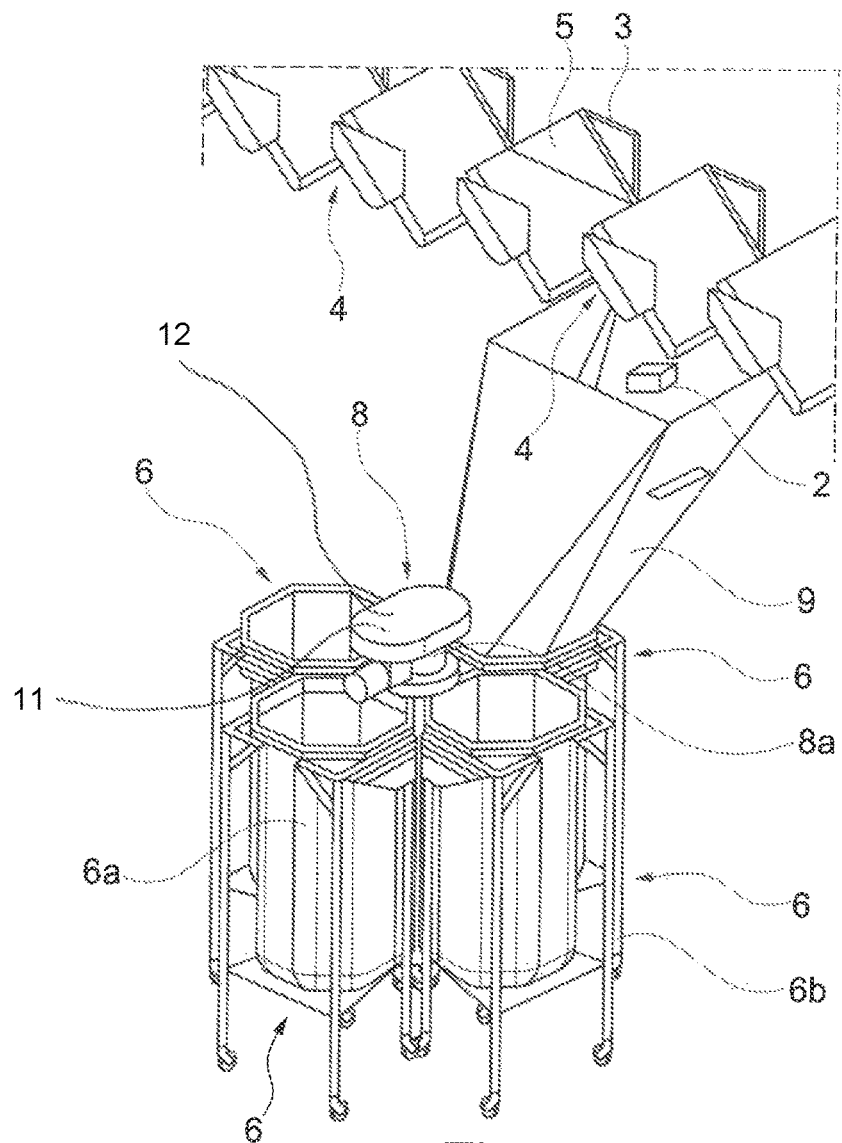
FIG. 1 diagrammatically shows a sorting outlet of a sorting facility of the invention, which sorting outlet is equipped with a swap-over system with a receptacle in the filling position.
Figure 5:
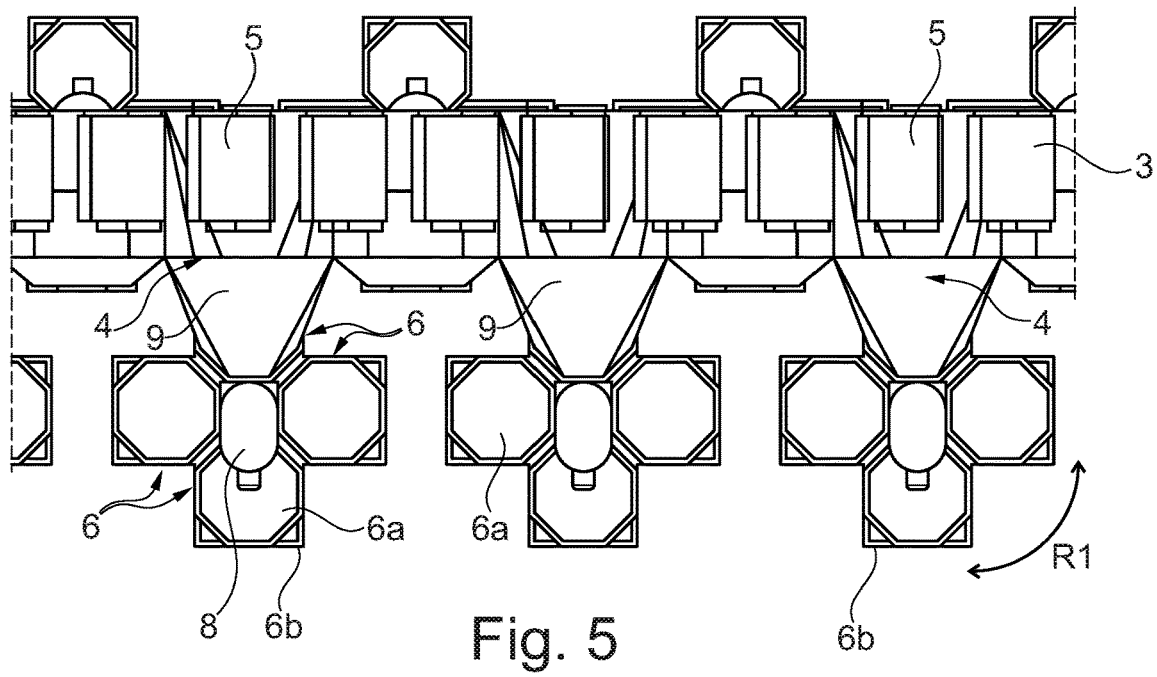
FIG. 5 is a diagrammatic plan view of a portion of a sorting facility of the invention.

The sorting conveyor 3 comprises pivotally mounted platforms or "trays" 5, as shown in FIGS. 1 and 5, suitable for pivoting so as to allow the parcels 2 to fall by gravity into the appropriate sorting outlets 4.

Each sorting outlet 4 is equipped with a plurality of receptacles 6 for parcels 2, the number of which receptacles may vary as a function of the number of destination addresses of the parcels 2 to be sorted.

For example, the receptacles 6 may be in the form of bags 6a that are open at their tops and that are mounted on trolleys 6b having small wheels or casters, as shown in FIG. 1.

This type of receptacle 6 is particularly well suited to being filled loosely with parcels 2 of small size that are of the "small packet type".

Each of the receptacles 6 is associated with a parcel destination address in a memory of the monitoring and control unit 7 of the sorting facility 1.

As shown in FIG. 2, the monitoring and control unit 7 also has a sorting plan in its memory for sorting the parcels 2 to be sorted, which sorting plan is defined on the basis of the distribution of all of the receptacles 6 and of the sorting outlets 4 within the sorting facility 1 and on the basis of the destination addresses of all of the parcels 2 to be sorted.

As shown in all of the FIGS. 1 to 6, a swap-over device 8 for swapping the receptacles 6 over is also provided at each sorting outlet 4 and comprises a shaft 8a that is mounted to move in rotation about an axis A1 and that is provided with docking means 8b for docking with receptacles so that the shaft is designed to drive the receptacles 6 docked with the shaft 8a in rotation about the axis.

In this example, the shaft 8a is designed to move clockwise or counterclockwise, and, after each movement in rotation, to hold a receptacle 6 stationary in a filling position in which the receptacle 6 is disposed under the sorting outlet 4 for the purpose of receiving a parcel 2.

The monitoring and control unit 7 is parameterized to control the swap-over device 8 on the basis of the destination addresses of the parcels 2 to be sorted and of the sorting plan.

Thus, the unit 7 controls the swap-over device 8 in order to place a receptacle 6 in the filling position, the parcel destination address that is associated with said receptacle 6 corresponding to the destination address of a current parcel 2 to be sorted into the sorting outlet 4.

Figure 3:
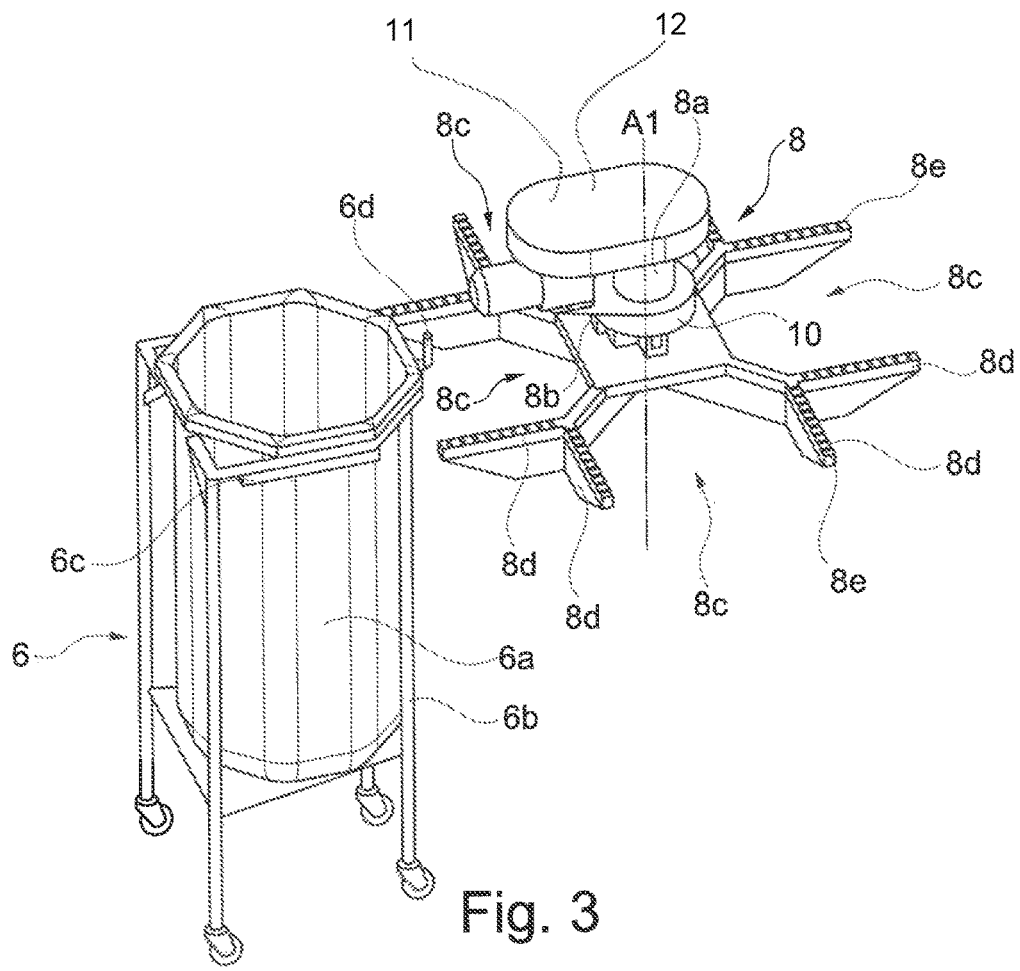
FIG. 3 is a highly diagrammatic view of a bin and of the swap-over system of the invention.
Figure 4:
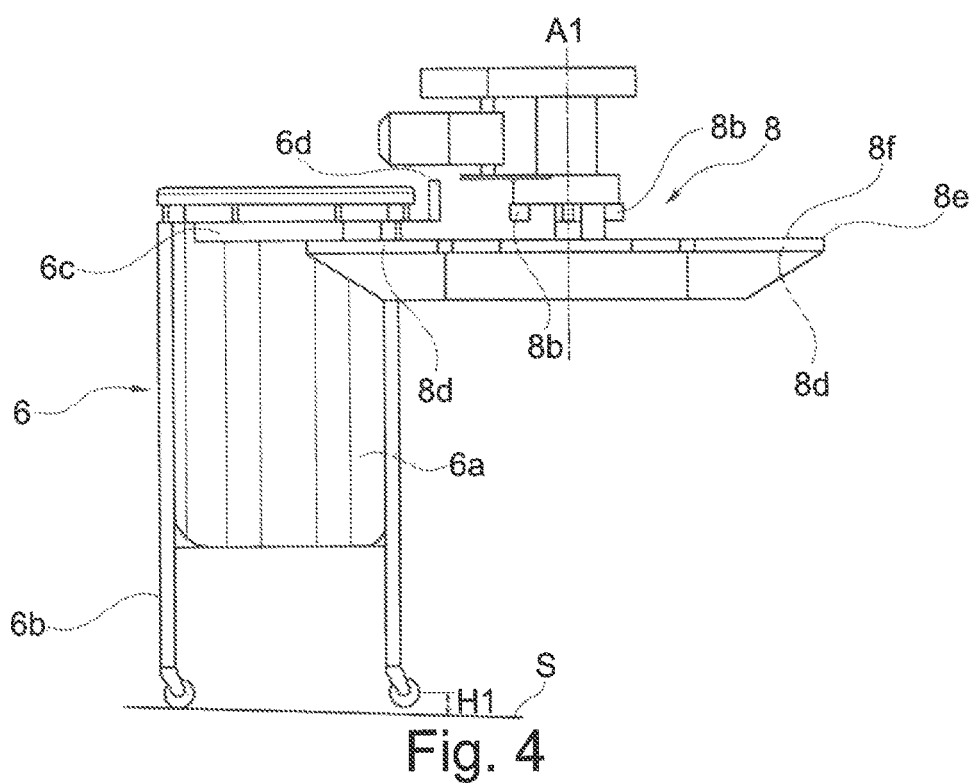
FIG. 4 is diagrammatic view of a bin and of the swap-over system of the invention, in which system the receptacle bears against the runners of the swap-over system for positioning the receptacle in a raised position.

In advantageous manner, in this example, the swap-over device 8 has a structure of the "revolver cylinder" type that is shown clearly in FIGS. 1 and 4, and that is provided with an electric or pneumatic actuator, with, all the way around the shaft 8a, docking locations 8c for receptacles 6, four of which locations are provided in this example, as shown in FIGS. 1 to 5.

It can thus be understood that increasing the number of docking locations 8c increases the number of logical outlets, thereby reducing the number of sorting passes on the sorting conveyor 3.

In this example, each docking location 8c is defined by a pair of mutually parallel runners 8d that extend horizontally from the shaft 8a.

In this example, the runners form support arms for receptacles 6 so as to carry the receptacles 6 above the floor S once the receptacles are docked.

As shown in FIG. 4, the receptacle 6 that is docking is raised in part by a height H1.

Friction between the receptacles 6 and the floor S is thus eliminated in this example, thereby limiting the force while the shaft is moving in rotation about the axis A1.

Each of the runners 8d may also have a free end 8e, shown in FIGS. 3 and 4, and inclined towards the floor, in order to guide the receptacles 6 so as to insert them into the docking locations 8c.

The receptacles 6 may also be equipped with forks 6c suitable for co-operating by sliding with the runners 8d.

Idler rollers 8f may also be disposed on the runners 8d, or indeed under the forks 6c in order to facilitate this sliding.

As shown in FIG. 5, the sorting outlets 4 are preferably distributed on alternate sides of the sorting conveyor 3.

Disposing the swap-over devices 8 in alternation on either side of the sorting conveyor 3 makes it possible to optimize the use of the floor area on the floor S and to increase the number of the sorting outlets 4 of the sorting conveyor 2 while also avoiding any interference between receptacles 6 of two successive swap-over devices 8 along the sorting conveyor 3.

Thus, in order to facilitate transfer of the parcels 2 into the receptacles 6, each sorting outlet 4 is equipped with a filling chute or hopper 9 that extends downwards from the sorting conveyor 3 to a receptacle 6 in the filling position.

In this example, the docking means 8b are in the form of a clamping clip fastened to the shaft 8a of the swap-over system 8 and suitable for coming to clamp onto a rod 6d extending vertically on the front face of a receptacle 6.

The docking means 8b thus make it possible to guide insertion of the receptacle 6 into the docking location 8c and to secure the receptacle 6 in the appropriate position for enabling it to move in rotation about the axis A1.

The swap-over device 8 may further comprise a locking cap 10 provided with a side opening 13.

In this example, the cap 10 is designed to come to cap the shaft 8a and the docking means 8b in such a manner as to prevent a receptacle 6 that is docked with the docking means 8b from being withdrawn when said receptacle is in the filling position, and to allow a receptacle that is docked with the docking means 8b to be removed via the opening 13 in the cap 10 when said receptacle 6 is in a removal position in which it is angularly positioned on the opposite side of the shaft 8a from a receptacle 6 that is in the filling position.

The locking cap 10 is also suitable for preventing a receptacle 6 that is docked with the docking means 8b from being withdrawn between the filling position and the removal position.

It can thus be understood that only the receptacle 6 that is in the removal position can be removed.

Figure 6:
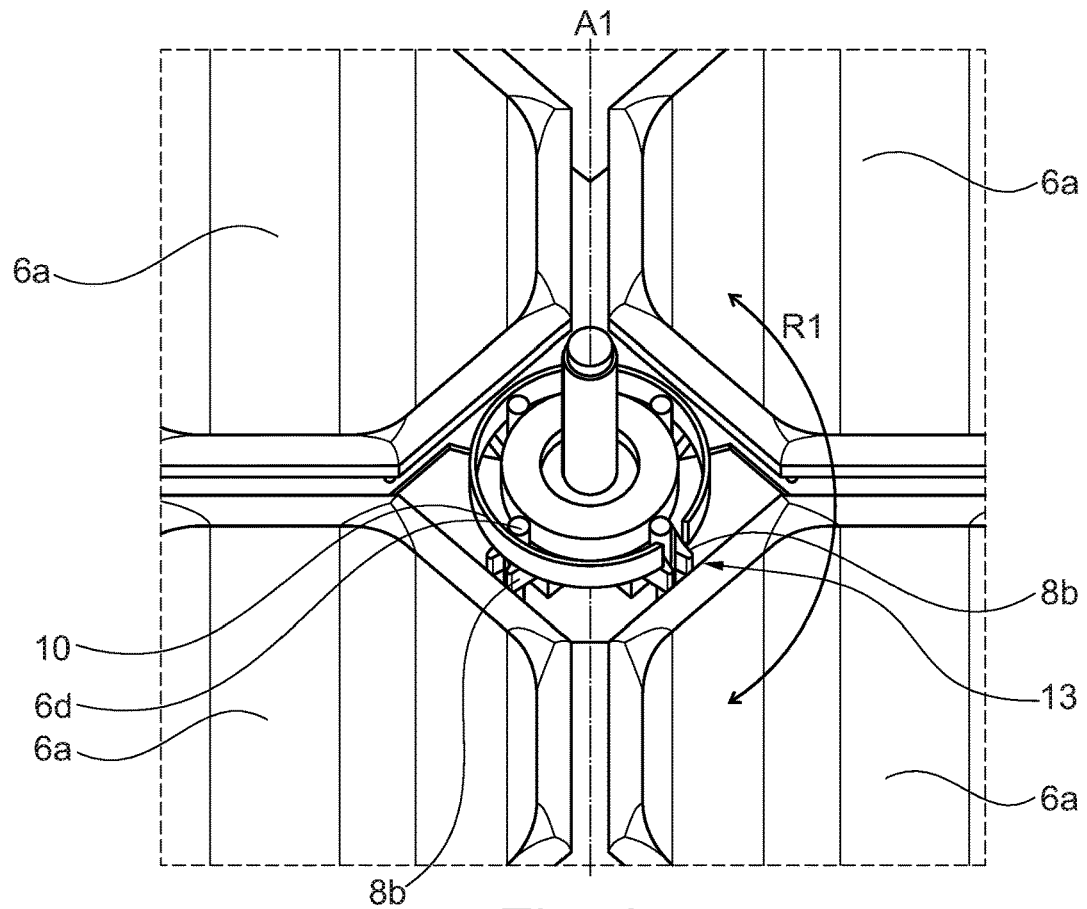
FIG. 6 is a diagrammatic view of means for securing and locking the swap-over device of the invention.

Thus, as shown in FIG. 6, not only, naturally, is the receptacle 6 in the filling position locked, but also the two other adjacent receptacles 6 that are in standby positions in this example are locked as well.

By means of this cap 10, the risk of the receptacles 6 falling off while they are moving in rotation is reduced.

The cap 10 also makes it possible to lock the clamping clips of the docking means 8b onto the rods 6d of the receptacles 6 when said receptacles are not moving in rotation R1, in particular in order to avoid any risk of the receptacle 6 being torn off during filling.

A second locking cap may also be disposed at the opposite end of the shaft 8a so as to secure the bottoms of the receptacles 6 and so as to improve the holding of the receptacles 6 while they are moving in rotation R1.

As shown in FIGS. 1 and 3, a receptacle position detection system 11 may also equip the swap-over device 8 in order to determine which receptacle 6 is in the filling position.

In this situation, the monitoring and control unit 7 contains, in a memory, the order of the receptacles 6 at each sorting outlet 4, and responds to the detection performed by said detection system 11 by causing the swap-over device 8 to move in rotation R1 so as to place in the filling position the receptacle 6 that has its destination address corresponding to the destination address of the current parcel 2 to be sorted.

The sorting facility 1 of the invention may further comprise a detection system 12 for detecting the level of filling of the receptacle 6 when it is in the filling position.

Thus, in response to a certain threshold for the filling level of the receptacle 6 being exceeded, the monitoring and control unit 7 causes the receptacle 6 to be moved into a removal position.

Thus, when the sorting facility 1 of the invention is being used to sort a current parcel 2, the monitoring and control unit 7 firstly interrogates the receptacle position detection system 11.

If the receptacle 6 in the filling position has its destination address corresponding to the destination address of the parcel 2 to be sorted, the parcel 2 is discharged into the receptacle 6.

If the address does not correspond, the swap-over system 8 moves the receptacles 6 in rotation R1 so as to position the receptacle 6 that has the corresponding destination address in the filling position.

If the swap-over device 8 does not have time to position the correct receptacle 6 in time, the parcel 2 is recycled, i.e. put back into circulation, on the sorting conveyor 3.

Once the parcel 2 is ejected, the monitoring and control unit 7 then interrogates the detection system 12 for detecting the level of filling of the receptacle 6.

If the receptacle 6 that is to receive the parcel 2 is full, the monitoring and control unit 7 prevents any discharging of the parcel 2 into said receptacle 6 and controls the swap-over device 8 so as to cause it to position the receptacle 6 in the removal position, so as to enable it to be removed manually or automatically, and so as to enable it to be replaced with an empty receptacle 6.

Once the full receptacle 6 has been replaced with an empty one, the monitoring and control unit 7 causes the receptacles 6 to be moved in rotation so as to place the appropriate receptacle 6 in the filling position and so as to enable the parcel 2 to be discharged.

The invention claimed is:

1. A sorting facility for sorting parcels, the sorting facility comprises a sorting conveyor, sorting outlets distributed along said conveyor, and a monitoring and control unit suitable for controlling the sorting conveyor so as to sort the parcels into the sorting outlets as a function of their destination addresses, each sorting outlet being arranged to store a plurality of sorting receptacles, each of which is associated with a parcel destination address in a memory of the monitoring and control unit,
   wherein at each sorting outlet, the sorting facility further comprises a swap-over device for swapping the receptacles over, the swap-over device comprises a shaft mounted to move in rotation about an axis and provided with docking means for docking with receptacles so that the shaft is designed to drive the docked receptacles in rotation about the axis, and in that the monitoring and control unit controls the swap-over device so that a receptacle for which the destination address associated with it in the memory of the monitoring and control unit corresponds to the destination address of a current parcel to be sorted is held stationary in a filling position in which the receptacle is positioned under the sorting outlet so as to receive a parcel.

2. The sorting facility according to claim 1, wherein the swap-over device further comprises runners that are mutually parallel in pairs and that extend horizontally from the shaft, and in that the runners are arranged to carry the receptacles above the floor once the receptacles are docked.

3. The sorting facility according to claim 2, wherein each of the runners has a free end that is significantly inclined towards the floor.

4. The sorting facility according to claim 1, wherein the swap-over device comprises a receptacle position detection system suitable for determining which receptacle of the sorting outlet is in the filling position, and in that the monitoring and control unit contains, in a memory, the order of the receptacles at each sorting outlet and, in response to the detection performed by said detection system, causes the swap-over device to move in rotation so as to place in the filling position the receptacle that has its destination address corresponding to the destination address of the current parcel to be sorted.

5. The sorting facility according to claim 1, wherein it further comprises a detection system for detecting the filling level of a receptacle in the filling position, and in that, in response to a certain threshold of the filling level of the receptacle being exceeded, the monitoring and control unit causes the receptacle to be moved to the removal position.

6. The sorting facility according to claim 1, wherein each sorting outlet is equipped with a filling chute that extends downwards from the conveyor to a receptacle in the filling position.

7. The sorting facility according to claim 1, wherein the receptacles are bags that are open at their tops and that are mounted on trolleys having small wheels or casters.

8. The sorting facility according to claim 1, wherein the conveyor is a looped conveyor.

9. The sorting facility according to claim 1, wherein the swap-over device further comprises a locking cap provided with a side opening, said cap coming to cap the shaft and the docking means so as to prevent a receptacle that is docked with the docking means from being withdrawn when said receptacle is in the filling position, and so as to allow a receptacle that is docked with the docking means to be removed via the opening in the cap when said receptacle is in a removal position in which it is angularly positioned on the opposite side of the shaft from a receptacle that is in the filling position.

10. The sorting facility according to claim 9, wherein said locking cap is also suitable for preventing a receptacle that is docked with the docking means from being withdrawn between the filling position and the removal position.

11. The sorting facility according to claim 9, wherein the swap-over device further comprises runners that are mutually parallel in pairs and that extend horizontally from the shaft, and in that the runners are arranged to carry the receptacles above the floor once the receptacles are docked.

12. The sorting facility according to claim 11, wherein each of the runners has a free end that is inclined towards the floor.

13. The sorting facility according to claim 9, wherein the swap-over device comprises a receptacle position detection system suitable for determining which receptacle of the sorting outlet is in the filling position, and wherein the monitoring and control unit contains, in a memory, the order of the receptacles at each sorting outlet and, in response to the detection performed by said detection system, causes the swap-over device to move in rotation so as to place in the filling position the receptacle that has its destination address corresponding to the destination address of the current parcel to be sorted.

14. The sorting facility according to claim 9, wherein the sorting facility further comprises a detection system for detecting the filling level of a receptacle in the filling position, and in that, in response to a certain threshold of the filling level of the receptacle being exceeded, the monitoring and control unit causes the receptacle to be moved to the removal position.

15. The sorting facility according to claim 9, wherein each sorting outlet is equipped with a filling chute that extends downwards from the conveyor to a receptacle in the filling position.

16. The sorting facility according to claim 9, wherein the receptacles are bags that are open at their tops and that are mounted on trolleys having small wheels or casters.

17. The sorting facility according to claim 9, wherein the conveyor is a looped conveyor.

18. The sorting facility according to claim 9, wherein said locking cap is also suitable for preventing a receptacle that is docked with the docking means from being withdrawn between the filling position and the removal position.

* * * * *